Figure 2:
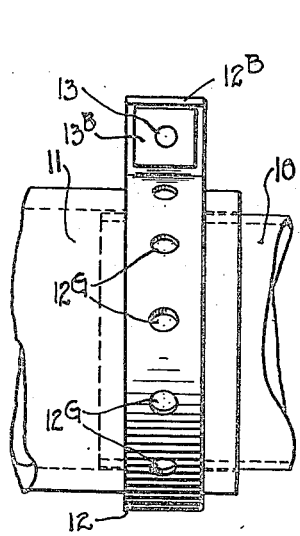

March 25, 1924.

C. VITEK

CLAMP

Filed Oct. 15, 1923

1,487,903

INVENTOR
Charles Vitek
BY Frank J Schmeder Jr
Attorney

Patented Mar. 25, 1924.

1,487,903

UNITED STATES PATENT OFFICE.

CHARLES VITEK, OF OMAHA, NEBRASKA.

CLAMP.

Application filed October 15, 1923. Serial No. 668,550.

*To all whom it may concern:*

Be it known that I, CHARLES VITEK, a citizen of the Republic of Czechoslovakia, residing at Omaha, in the county of Douglas and State of Nebraska, have invented new and useful Improvements in Clamps, of which the following is a specification.

This invention relates to improvements in hose clamps.

The principal object of this invention resides in the provision of a novel clamp having a resilient tightening member adapted to take up any loosening of the clamp should, for instance, the hose shrink due to heat or vibrations.

A further object of the invention is to provide a hose or pipe clamp in which, through simple manipulation of an adjusting screw, the entire circumference of the outer hose or pipe, and particularly the side walls of the same, are firmly gripped and pressed against the inner one.

Another object of the invention is to provide means in this clamp for quickly releasing the clamp from the side walls when it is desired to disconnect one of the tubular members from the other.

It is, furthermore, an object of the invention to provide a novel form of a hose clamp which can be manufactured at very small expense and which can be manipulated in a very simple way for fastening two tubular members at their telescoping ends to each other.

With these and other objects in view, an embodiment of the invention is illustrated in the accompanying drawing, and described in the following specification, the novel features being pointed out in the appended claims.

Figure 1:
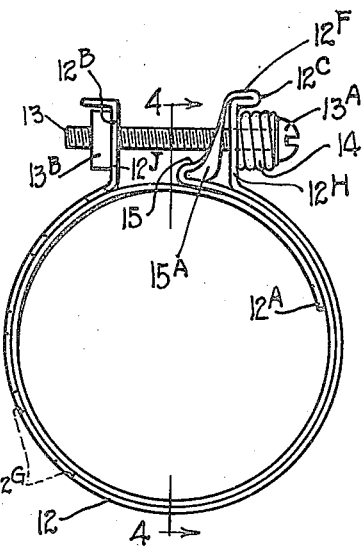
Figure 3:
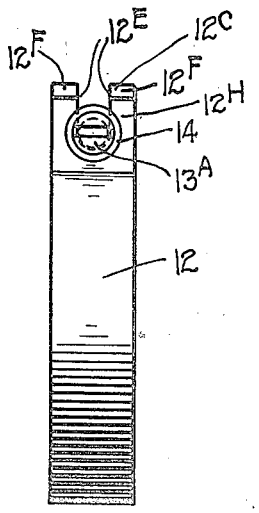
Figure 4:
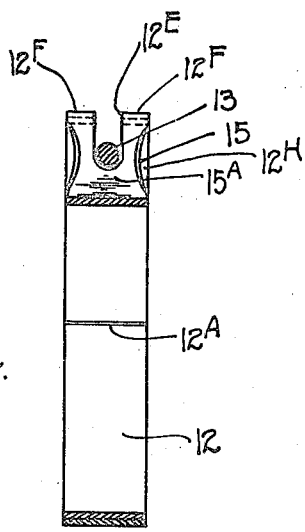

In the drawings:

Fig. 1 is a side elevation of a clamp embodying my invention and Figures 2 and 3 are end elevations of same. Figure 4 is a section taken on line 4—4 of Figure 1.

Referring to the drawings which illustrate one form of my invention, the clamp is here shown as connecting or clamping a pipe 10 telescoped within a hose 11, and the structure shown comprises a continuous flexible band 12 of steel or other suitable material, formed into a ring with the material doubled or folded over itself providing a very strong clamp.

In making the clamp, the band 12 is folded over itself from a point $12^C$ approximately midway its end, the end $12^A$ forming the inner band being slightly longer than the nut retaining end $12^B$.

At the point of bending, $12^C$, the doubled band is bent for a short distance at an angle toward the end $12^B$ to form a brace 15 for the vertical wall $12^H$, against which wall the coil spring 14 exerts pressure when compressed by the head $13^A$ of the tightening bolt 13. The brace portion 15 is further depressed intermediate the ends thereof as at $15^A$ to strengthen the brace. The upper end of the wall $12^H$ and the brace 15 is slotted as shown at $12^E$ to receive the shank of the bolt 13. In order to strengthen this wall $12^C$, the upper ends on both sides of the slot $12^D$ are bent laterally at right angles to the wall forming stiffening flanges $12^F$.

The end $12^B$ is provided with a plurality of holes $12^G$ to afford adjustability of the clamps to slightly varying diameters.

The portion of the band to the right of the folding point $12^C$ forming the outer circumference may be termed "outer band portion" and the portion of the band extending below the brace portion 15 may be termed "inner band portion."

In adjusting the clamp as to diameter, the proper slot $12^G$ is first determined and the band can then be readily bent upward with a pair of pliers to form the abutment wall $12^J$ for the nut $13^B$.

I claim:

1. A clamp comprising a band of flexible material folded over itself and forming substantially a double circular band with an outer band portion and an inner band portion, a part of the outer band portion adjacent the fold and the end of the outer band portion forming walls which are disposed at an angle to the circumference of the intermediate part thereof, a tightening bolt extending between said walls, and a resilient member adapted for compression on tightening of said bolt.

2. A clamp comprising a band of flexible material folded over itself and forming substantially a double circular band with an outer band portion and an inner band portion, a part of the outer band portion adjacent the fold and the end of the inner band portion forming walls which are angularly disposed to the circumference of the intermediate portion thereof, a part of the inner band portion adjacent the fold being bent at an angle as a brace to said wall portion adjacent said fold, a tightening bolt extending between said walls, and a spring adapted for compression on tightening of said bolt.

3. A clamp as embodied in claim 1, and including a slot in the folded end to permit the withdrawal of the tightening bolt from engagement with the wall adjacent the fold without detaching the nut at the end of the bolt.

4. A clamp as embodied in claim 2, and including a slot in the folded end to permit the withdrawal of the tightening bolt from engagement with the wall adjacent the fold without detaching the nut at the end of the bolt.

5. A clamp as embodied in claim 1, and including the folded end bent at substantially right angle to the adjacent wall in the outer band portion, and a slot in the folded end to permit the withdrawal of the tightening bolt from engagement with the folded portion without detaching the nut at the end of the bolt.

6. A clamp as embodied in claim 2, and including the folded end bent at substantially right angle to the adjacent wall in the outer band portion, and a slot in the folded end to permit the withdrawal of the tightening bolt from engagement with the folded portion without detaching the nut at the end of the bolt.

7. A clamp comprising a circularly bent band of flexible material, said band having spaced integral walls bent at substantially right angles to the circumference of the band, means for drawing said walls toward each other to tighten the band, and resilient means adapted for compression upon the tightening of the band.

8. A clamp as embodied in claim 1, and including a brace formed integral with the wall adjacent the folded end of said outer band portion.

In witness whereof I affix my signature.

CHARLES VITEK.